March 23, 1937.  J. ELKINS  2,074,378
COSMETIC MAKE-UP DEVICE
Filed Aug. 16, 1934
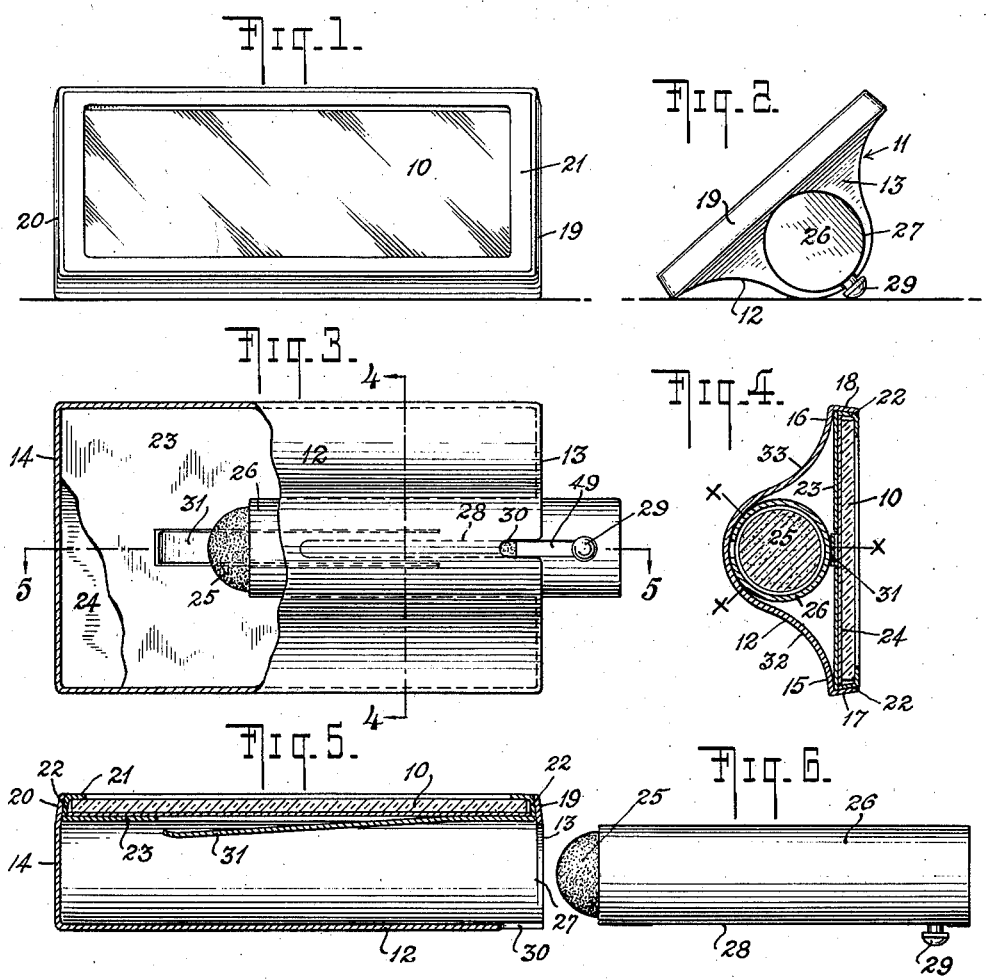
WITNESS
G. V. Rasmussen
INVENTOR
JULIA ELKINS
BY
Biesen Achrend
ATTORNEYS Patented Mar. 23, 1937

2,074,378

UNITED STATES PATENT OFFICE 2,074,378

COSMETIC MAKE-UP DEVICE

Julia Elkins, New York, N. Y.

Application August 16, 1934, Serial No. 740,116

3 Claims. (Cl. 88—97)

This invention relates to cosmetic make-up devices which are provided with a mirror and has for its principal object to provide a device of the type indicated in which the mirror thereof is integrally associated with a base section acting as a weight and adapted to receive the cosmetic material and so positioned relative to the mirror that the latter is maintainable in proper position by the former.

Other objects will appear from the following description taken in connection with the accompanying drawing which illustrates several embodiments of the invention without defining its limits. In said drawing, Fig. 1 is a front perspective view of one illustrative embodiment of the invention in position for use; Fig. 2 is an end view of the device shown in Fig. 1; Fig. 3 is a rear elevation, partially in section, of the device shown in Fig. 1; Fig. 4 is a transverse section taken on line 4—4 of Fig. 3; Fig. 5 is a vertical section of the body portion of the device taken on line 5—5 of Fig. 3; and Fig. 6 is a side view of the lipstick and holder therefor carried by the device.

Referring more particularly to the drawing, the make-up assembly illustrated comprises a rectangularly shaped mirror 10 which is of suitable size for the purposes of the device and constitutes the front side of a hollow base section 11 so formed and weighted that the mirror is maintained in a convenient inclined position for use when the assembly is placed on a support, as will be hereinafter more fully explained.

As shown in the drawing, the base section 11 comprises a rear wall 12 and end walls 13 and 14. The flared end portions 15 and 16 of the rear wall 12 are bent forwardly to form the projecting edges or flanges 17 and 18, such flanges together with the forward edges 19 and 20 of the end walls 13 and 14, respectively, and the flared end portions 15 and 16 of the rear wall 12 forming a supporting housing for the mirror 10 and the frame 21 within which the mirror 10 is positioned. The flanged edge 22 of the frame 21 is bent or extends outwardly at an obtuse angle from the rear face of the rim portion thereof which engages the outer edge portions of the face of the mirror, such flanged edge 22 being positioned within and enclosed by the flanges 17 and 18 of the rear wall 12 and the forward edges 19 and 20 of the end walls. The flanged portions 17 and 18 of the rear wall 12 and the forward edges 19 and 20 of the end walls 13 and 14, respectively, are bent or inclined inwardly against the sloping sides of the flange edge 22 of the frame so that the latter, together with the mirror 10, are securely fastened to the base section 11 and form an integral part thereof.

A plate 23 made of spring metal or other suitable material is supported on a practically flat part of the flared end portions 15 and 16 of the rear wall 12, intermediate such portions and the mirror 10, such plate forming a backing for the mirror 10. A layer of paper 24 is positioned intermediate the plate 23 and the back of the mirror 10.

The body portion of the base section 11 is disposed outwardly from the rear of the mirror 10 and is symmetrically formed with reference to a horizontal plane extending through the central horizontal axis of the mirror, as shown in Fig. 4, the outer rear portion thereof being substantially semi-circular in cross-section thereby giving the body portion of the base section 11 a substantially cylinder-like appearance. Due to this construction the cylinder-like body portion of the base section forms a weighted portion which supports and maintains the mirror in an inclined position convenient for use when the assembly is placed on a table or other like support and about which the mirror may be moved backwardly and forwardly in seesaw fashion. The cylinder-like portion of the base section 11 is adapted to snugly receive a lipstick 25 and supporting shell 26 therefor.

The end wall 13 of the base section is provided with an aperture 27 to enable the lipstick and supporting shell 26 to be slidably inserted in the base section 11. The supporting shell 26 may be of a usual construction, the closed end portion thereof being substantially the same size and shape as the aperture in the end wall 13 so that the end wall 13 of the supporting shell 26 will lie flush with the outer side of the end wall 13 of the base section when the lipstick is positioned in the base section. In the construction illustrated the supporting shell 26 is provided with a longitudinal slot 28 formed in the peripheral surface thereof. A pin 29 extends through the slot 28 in the supporting shell and is rigidly connected at its inner end to an annular element 49 slidably mounted inside the supporting shell 26 and adapted to grip the end of the lipstick 25. The lipstick 25 may thus be slidably moved in and out of the supporting shell by sliding the pin 29 along the slot 28. The pin is adapted to engage a slot 30 formed in the outer rounded side of the base section 11 to limit the inward movement of the supporting shell within such base section.

Interiorly of the base section 11 on the lower surface of the backplate 23 is a longitudinally disposed spring member or tongue 31 having a bent free end adapted to frictionally engage the outer periphery of the supporting shell 26 for braking the movement of such shell when the lipstick is inserted in the base section and for securely holding the lipstick supporting shell 26 in the base section when not in use. The spring member 31 is preferably stamped out from the spring metal of the back plate 23 so that the free end thereof is adjacent the closed end 14 of the base section and bent inwardly of the casing away from said back plate 23 so that it will engage the outer periphery of the supporting shell 26.

The concaved portions 32 and 33 of the base section form longitudinally extending exterior grooves which are adapted to provide a grip for the user so that the assembly may be held lengthwise between two fingers of the hand of the user, the weighted cylinder-like body portion of the base section extending between the fingers used to safely maintain the assembly in position on the hand with a minimum of effort regardless of the angle at which the mirror is being held while in use.

The interior of the shell 12 is so shaped and dimensioned as to establish a plurality of lines of contact for the holder 26 as indicated at $x$ in Fig. 4.

The base section, comprising the rear wall 12 and the end walls 13 and 14 may be either a built-up structure or made of sheet metal or it may be an integral structure molded or cast as desired and as best suited to the nature of the material employed. I preferably however make the base section 11 of a thin sheet of brass or stainless steel or other metal and draw it into the proper shape. The outer surface of the metal may be polished, plated or coated with enamel in solid color or provided with an enameled design.

While I have illustrated a desirable embodiment of the invention, I wish it to be understood that the invention is not necessarily limited thereto and that changes in the material, size and relative arrangement of the parts as well as the substitution of equivalents may be made without departing from the spirit of the invention.

I claim:

1. A device comprising a frame for encompassing the rear, side and front edge portions of a glass mirror, the edge portions of the frame adapted to be out of contact with the glass and converging toward the front to form a hollow space between said edge portions of the frame and the edge portions of the glass, a support for the frame consisting of a hollow base section flaring outwardly toward the frame and having forward edge portions bent convergently in a direction toward the front of the frame and in contiguous relation to the edge portions of said frame in such a manner that the frame is retained in fixed relation with respect to the base section, while maintaining the spacing between the edge portions of the glass and its frame, one of said edge portions and a portion on said hollow base section spaced from said edge portion forming points of contact for said frame with a horizontal surface upon which said frame is placed with the face of the mirror in tilted position, one of the end walls of the support being apertured, a holder for a stabilizing medium seated within said aperture and in the hollow space of the support and contacting with the rear surface of the frame, and at least partially maintained by such contact in proper position within the support, said holder being so located relative to the points of contact that when a stabilizing medium is inserted in said holder the center of gravity of the device is located in a vertical plane between the two points of contact, whereby the device is prevented from tilting.

2. A device as set forth in claim 1, in which the rear wall of the frame includes a spring member flexed toward the holder.

3. A device comprising a frame for encompassing the rear, side and front edge portions of a glass mirror, the edge portions of the frame adapted to be out of contact with the glass and converging toward the front to form a hollow space between said edge portions of the frame and the edge portions of the glass, a support for the frame consisting of a hollow base section flaring outwardly toward the frame and having forward edge portions bent convergently in a direction toward the front of the frame and in contiguous relation to the edge portions of said frame in such a manner that the frame is retained in fixed relation with respect to the base section, while maintaining the spacing between the edge portions of the glass and its frame, a spring member on the rear surface of the frame, one of said edge portions and a portion on said hollow base section spaced from said edge portion forming points of contact for said frame with a horizontal surface upon which said frame is placed with the face of the mirror in tilted position, one of the end walls of the support being apertured, a holder for a stabilizing medium seated within said aperture and in the hollow space of the support and contacting with said spring member, and at least partially maintained by such contact in proper position within the support, the hollow base section, at its portions most remote from the mirror, being contoured to provide an interior contact surface for said holder so that the latter is maintained in its proper position within the hollow base section partly by reason of its contact with said section and partly by its contact with said spring member, said holder being so located relative to the points of contact that when a stabilizing medium is inserted in said holder the center of gravity of the device is located in a vertical plane between the two points of contact, whereby the device is prevented from tilting.

JULIA ELKINS.